Patented Aug. 18, 1925.

1,550,650

UNITED STATES PATENT OFFICE.

HENRY W. BANKS, 3D, OF NOROTON, CONNECTICUT, ASSIGNOR TO LOOMIS, STUMP & BANKS, OF NEW YORK, N. Y., A PARTNERSHIP.

COLLOIDAL-FUNGICIDAL SULPHUR COMPOSITION.

No Drawing.   Application filed March 3, 1925. Serial No. 12,992.

*To all whom it may concern:*

Be it known that I, HENRY W. BANKS, 3d, residing at Noroton, in the county of Fairfield, State of Connecticut, have invented certain new and useful Improvements in Colloidal Fungicidal Sulphur Compositions; and I do hereby declare the following to be a full, clear, and exact description of the invention, such as will enable others skilled in the art to which it appertains to make and use the same.

This invention relates to colloidal fungicidal sulphur compositions and methods of preparing the same. Among the principal objects of the invention is the provision of an improved sulphur-containing composition having superior fungicidal properties and which may be made from materials that are conveniently obtainable in sufficiently large quantities for general use in the control of various diseases and pests of crops and other plants. A further object of the invention is the provision of an improved colloidal sulphur in dry form suitable for application as a fungicide either as a dust or which may be conveniently combined or mixed with or dissolved in water and applied to the plants as a spray.

I am aware that prior to my invention various so-called dry colloidal fungicidal sulphur compositions were known which it has been claimed, could be applied either as a dust or in combination with water as a spray or liquid but these older compositions do not possess the superior fungicidal properties of my composition or they are difficult to prepare or involve the use of materials which are not conveniently obtainable in sufficiently large quantities or else possess some other similar disadvantage.

The present invention largely or completely overcomes the foregoing difficulties and disadvantages by providing a fungicidal colloidal sulphur in dry form miscible with water to form a stable colloidal solution of sulphur which may be used as a spray and which is made by converting sulphur into a fluid condition, preferably by heating ordinary sulphur to a temperature above its melting point and subjecting the fluid sulphur to the action of a water-absorbent jell-forming medium capable of forming with the heated sulphur a mass containing the sulphur in an extremely finely dispersed condition and distributed uniformly through the medium.

As the water-absorptive jell-forming medium I prefer to employ a water absorptive, jell-forming clay such as bentonite which is capable of absorbing large amounts of water to form first a jelly-like mass and with yet more water a stable colloidal solution of the clay in the water and in carrying out my invention I may prepare my improved fungicidal sulphur composition in accordance with the following example:

*Example 1.*—25 pounds of bentonite are mixed with 25 pounds of sulphur. This mixing should be done in such a way that the two ingredients are evenly distributed. So as to secure even distribution it is advisable that both the ingredients should be powdered to a fineness sufficient for thorough and convenient mixing. Five minutes or less in any of the usual types of mixing machinery, or a few minutes turning over with a shovel will accomplish this result. The mixed powders are then heated by any convenient means to a temperature of from 125 degrees C. to 140 degrees C. until the whole mass has been elevated to a uniform heat. Higher temperatures may be used, but present no special advantages. At temperatures approaching the boiling point of sulphur, where the vapor pressure of sulphur becomes considerable, it is evident that an unnecessary and inconvenient volatilization of sulphur will occur, and this may be undesirable under certain circumstances. When the mass has reached a uniform heat somewhat above the melting point of sulphur a sort of sintering effect takes place, and individual particles of yellow sulphur are no longer seen distributed through the bentonite. The mass becomes substantially uniform in color. At this point it may be allowed to cool. When cool, a friable material results which may be ground to a fine powder by any convenient means, such as grinding and disintegrating machinery, ball mills, tube mills, and the like. The operation of mixing, heating, cooling, grinding and the like may be done in a number of ways, which will be evident to those skilled in the art. The material may be agitated during heating or during cooling or may be simply heated and cooled in any convenient container. If it is desired to make a cake which is extremely friable and easily ground, the proportion of sulphur may be somewhat less—for example, fifteen pounds of sulphur to twenty five pounds of bentonite. If an excess of sulphur is used (for example, twenty five pounds of sulphur to fifteen pounds of bentonite) a material is obtained which will disperse in water as will the mixtures referred to above; but in this case the cake is rather hard, and will require grinding treatment of a more difficult nature than the cakes containing an excess of bentonite. In fact the material obtained by so heating a mixture of sulphur and bentonite containing an excess of bentonite may be crushed to a fine powder between the fingers. If it is desired to use the sulphur in this finely dispersed form in an aqueous medium, water may be stirred directly into the cake. A pasty material is obtained which forms a colloidal solution in water. By treatment with water the material may be employed in making fungicidal sprays, or for other purposes where a solution or dispersion of colloidal sulphur is desirable. For this purpose it will sometimes be found desirable to add to the colloidal solution a small amount of soap or other dispersing agent to increase the stability of the colloidal solution.

*Example 2.*—Ordinary finely ground sulphur such as is now commonly employed as a fungicide for dusting plants and which is usually ground to a fineness such that about ninety percent or more will pass a 200 mesh sieve is intimately mixed with the ground product or combination of bentonite and sulphur obtained as described in example 1. The proportion of the dry bentonite-sulphur product may vary from a fraction of a percent up to ninety per cent or more by weight of the mixture and the mixing of the two constituents may be carried out in any convenient manner. The product thus obtained consisting essentially of a mixture of finely ground elementary sulphur with the dry and finely ground bentonite-sulphur product of Example 1, I have found to be an efficient fungicidal dust for dusting plants in the control of plant diseases and it may be applied to the plants by means of dusting machines of any suitable type such as the well-known machines designed for this purpose which propel the sulphur dust upon the plant by means of a rotating fan enclosed in a suitable casing and provided with suitable means for introducing the sulphur into the machine and means for directing the dust upon the plant.

It will be understood that my invention is not restricted to the foregoing examples but that I may make various changes in the proportion of the ingredients and in the method of combining them without departing from the scope of my invention as set forth in the appended claims. Thus in Example 1, I may use any proportion of sulphur to bentonite from a fraction of one per cent of sulphur up to seventy five per cent of sulphur or more. Likewise instead of heating the sulphur to just a little above its melting point I may heat the sulphur to a higher temperature as for example, up to the temperature at which, after first thickening, it becomes more fluent again. Or I may vaporize the sulphur and bring the vaporized sulphur into intimate contact with the bentonite or similar water-absorbent medium. But I prefer to employ the method as set forth in Example 1.

I have found that when I employ as little as a fraction of one per cent by weight of heated congealed sulphur in the product prepared in accordance with Example 1, that I obtained a material having a fungicidal power sufficient to prevent the germination of the uredospores of grain rusts when the material is brought into contact in dry form with the uredospores in any convenient manner, and later exposed to moisture under conditions otherwise favorable for germination and that even one tenth of one per cent produces an inhibitory effect upon certain fungus spores. My improved product therefore is suitable for application to grain crops and for similar purposes in controlling fungicidal diseases of plants. My invention also comprises mixing the bentonite-sulphur product of Example 1, with finely ground sulphur as described in Example 2, above, and I find that the product thus obtained is effective as a fungicide in the control of crop diseases even when the proportion of the heated and congealed sulphur contained in the product is as low as a fraction of one per cent by weight of the total.

When it is desired to obtain a dust made in accordance with my invention having a stronger fungicidal power than that which corresponds to a fungicidal power sufficient to prevent the germination of uredospores of grain rusts I employ a correspondingly larger proportion of the heated congealed sulphur in the product, or, in other words, I have found that the fungicidal power is more or less proportional to the amount of heated congealed sulphur employed.

It will be understood that in the practice of my invention as set forth in Example 2 above, I am not restricted to the use of ground sulphur but I may substitute for the ground sulphur any other suitable medium or diluent such as: dehydrated copper sulphate, copper carbonate, talc, arsenate of lead, ground blast furnace slag, and the like. It will be understood further that the heated congealed sulphur contained in my improved fungicidal compound when taken up with water is dispersed in the water in a colloidal state, comparable in particle size or degree of dispersion with hydrophilic colloidal sulphur such as may be obtained by precipitating sulphur from hydrogen sulphide solution by means of sulphur dioxide in the presence of a protective colloid such as gelatine, and I have found that the fungicidal power of the heated, congealed sulphur in my improved composition is substantially equal to the fungicidal power of hydrophilic colloid sulphur prepared as described above.

The expressive "water-absorptive, jell-forming medium" as used herein means any material capable of absorbing water to form a jelly-like or pasty mass and which also is capable in dry form of absorbing or taking up the sulphur from a fluid state (liquid or gaseous) to form a mass in which the sulphur is dispersed in an extremely finely divided condition therein and which when subjected to the action of water will form a colloidal solution of the sulphur.

It will be understood that the expression "substantially dry" as employed herein means a material sufficiently dry to absorb the fluid sulphur, thereby producing a uniform dispersion of the sulphur in the medium as specified.

In my copending application Serial No. 18,766, I disclose and claim the combination of bentonite or like medium with sulphur broadly, and accordingly in the present application I do not claim the aforesaid combination of bentonite of the like with sulphur broadly, but I claim:

1. A fungicidal composition of matter comprising a substantially dry, inorganic water-absorptive jell-forming medium and sulphur congealed in situ therein.

2. A fungicidal composition of matter comprising substantially dry bentonite and sulphur congealed from a fluid state in situ in the bentonite.

3. In a method of dispersing sulphur in colloidal state in water, the step which comprises heating the sulphur in the presence of an inorganic, water-absorptive medium to a temperature above the melting point of the sulphur thereby producing a dispersion of the sulphur throughout the medium.

4. In a method of preparing colloidal sulphur the step which comprises heating the sulphur to a temperature above its melting point and bringing the heated sulphur into intimate contact with an inorganic water-absorptive jell-forming medium.

5. In a method of dispersing sulphur in colloidal state in water, the step which comprises heating the sulphur in the presence of bentonite to a temperature above the melting point of the sulphur thereby producing a dispersion of the sulphur throughout the bentonite.

6. In a method of preparing colloidal sulphur the step which comprises subjecting a substantially dry, inorganic water-absorptive jell-forming medium to the action of fluid sulphur thereby producing a dispersion of the sulphur throughout the medium.

7. A fungicidal composition of matter comprising bentonite, sulphur congealed in situ therein and a carrier.

8. A fungicidal composition of matter comprising bentonite, sulphur congealed in situ therein and ordinary ground sulphur having a fineness such that about ninety percent will pass a 200 mesh sieve.

9. A fungicidal composition of matter comprising bentonite, sulphur congealed in situ therein and ordinary ground sulphur having a fineness such that it is capable of dusting upon plants.

10. A fungicidal composition of matter comprising a substantially dry, inorganic water-absorptive jell-forming medium and sulphur congealed in situ therein in a proportion by weight greater than about one-tenth of one percent.

11. In the method of preparing colloidal sulphur, the step which comprises subjecting bentonite to the action of fluid sulphur thereby producing a dispersion of the sulphur throughout the bentonite.

12. In a method of preparing colloidal sulphur in dry form, the step which comprises subjecting substantially dry bentonite to the action of fluid sulphur thereby producing a dispersion of the sulphur throughout the bentonite.

In testimony whereof I affix my signature.

HENRY W. BANKS, 3d.